United States Patent [19]
Sutter, Jr.

[11] Patent Number: 4,494,236
[45] Date of Patent: Jan. 15, 1985

[54] PULSED RF PUMPED WAVEGUIDE LASER

[75] Inventor: Leroy V. Sutter, Jr., Culver City, Calif.

[73] Assignee: Hughes Aircraft Company, El Segundo, Calif.

[21] Appl. No.: 61,082

[22] Filed: Jul. 26, 1979

[51] Int. Cl.³ .............................................. H01S 3/10
[52] U.S. Cl. ...................................... 372/25; 372/64; 372/36
[58] Field of Search .................... 331/94.5 C, 94.5 G, 331/94.5 PE

[56] References Cited

U.S. PATENT DOCUMENTS 4,169,251 9/1979 Laakmann ...................... 331/94.5 C

OTHER PUBLICATIONS

"A Transversely RF-Excited $CO_2$ Waveguide Laser" by Lachambre et al., *Appl. Phys. Lett.*, vol. 32, No. 10 (May 15, 1978).

High Repetition-Rate and Quasi-CW Operation of a Waveguide $CO_2$ TE Laser" by Smith et al., *Opt. Comm.* vol. 16, No. 1, Jan. 1976.

*Primary Examiner*—William L. Sikes
*Assistant Examiner*—Léon Scott, Jr.
*Attorney, Agent, or Firm*—Paul M. Coble; A. W. Karambelas

[57] ABSTRACT

A waveguide gas laser is disclosed excited with bursts of a transverse rf electric field at a frequency ranging from about 30 MHz to about 3 GHz. The bursts have a duration ranging from about 0.1 μsec. to about 10 μsec. and a repetition rate ranging from about 500 Hz to about 100 kHz. This excitation is sufficiently rapid to produce gain switching in the laser gas, resulting in high peak power, short duration, single-line laser output pulses.

6 Claims, 6 Drawing Figures

PULSED RF PUMPED WAVEGUIDE LASER

The invention described herein was made in the course of or under a contract or subcontract thereunder with the U.S. Government.

TECHNICAL FIELD

This invention relates to lasers, and more particularly, it relates to a waveguide gas laser excited with bursts of rf energy.

BACKGROUND ART

Waveguide gas lasers excited by means of a transverse discharge at rf frequencies generally in the vhf-uhf range are disclosed in patent application Ser. No. 869,542, filed Jan. 16, 1978, by K. D. Laakmann, entitled "Waveguide Gas Lasers With High Frequency Transverse Discharge Excitation", and assigned to the assignee of the present invention.

In a paper by J. L. Lachambre et al, "A Transversely RF-Excited $CO_2$ Waveguide Laser", *Applied Physics Letters*, Vol. 32, No. 10 (May 15, 1978), pages 652–653, a laser of the foregoing type is disclosed which was operated in an rf pulse mode by applying 100 $\mu$sec. duration bursts of rf excitation to the laser. Multi-line laser output pulses were obtained of a maximum peak power of around 13 watts and a minimum duration of about 20 $\mu$sec.

SUMMARY OF THE INVENTION

It is an object of the present invention to provide a waveguide gas laser which is excited with bursts of transverse rf energy and which provides laser output pulses of substantially higher peak power than heretofore has been achieved with this type of laser.

It is a further object of the invention to provide a waveguide gas laser which is excited with bursts of transverse rf energy and which provides laser output pulses of considerably shorter duration than previously has been achieved with lasers of this type.

It is another object of the invention to provide a waveguide gas laser which furnishes single-line laser output pulses that are frequency stable in the lowest order mode.

It is a still further object of the invention to provide a laser of the foregoing type which additionally is a minimum size, weight, and complexity and which may be excited with relatively small rf excitation voltages.

In a waveguide laser according to the invention a laser gas is disposed in an elongated chamber of cross-sectional dimensions suitable for guiding laser light. A laser-exciting discharge is established in the laser gas by means of an excitation electric field provided in the chamber along a direction transverse to its length. The excitation electric field consists of a series of bursts of an alternating electric field at a frequency ranging from about 300 MHz to about 3 GHz, the bursts having a duration ranging from about 0.1 $\mu$sec. to about 10 $\mu$sec. and a repetition rate ranging from about 500 Hz to about 100 kHz.

Additional objects, advantages, and characteristic features of the invention will become readily apparent from the following detailed description of a preferred embodiment of the invention when considered in conjunction with the accompanying drawings.

DETAILED DESCRIPTION OF THE INVENTION

Figure 1:
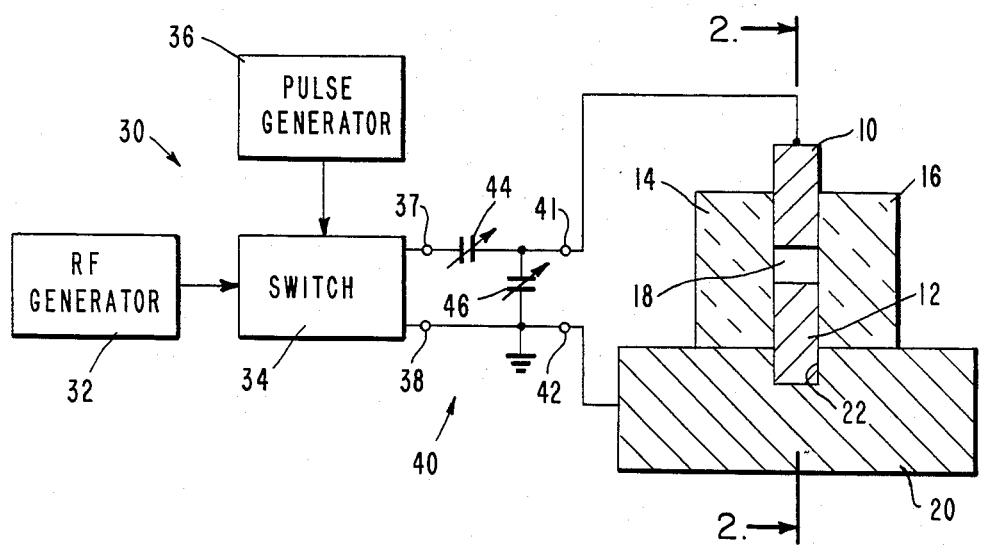
FIG. 1 is a cross-sectional view, partly in block and schematic circuit form, illustrating a waveguide laser according to the invention.
Figure 2:
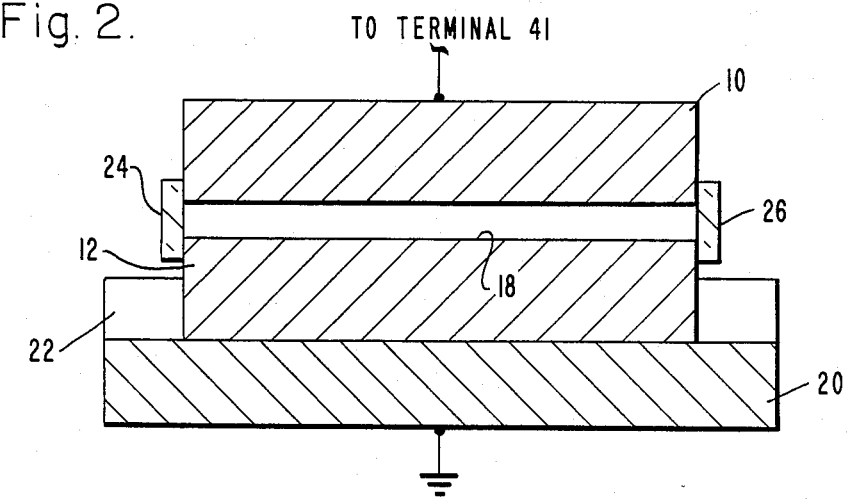
FIG. 2 is a longitudinal sectional view of the laser of FIG. 1 as taken along line 2—2.

Referring to FIGS. 1 and 2 with greater particularity, a waveguide laser according to the invention may be seen to include a pair of opposing elongated electrically conductive electrode members 10 and 12 interposed between a pair of opposing elongated dielectric members 14 and 16 in a manner defining an elongated chamber 18 wherein a laser-exciting discharge is generated. It is pointed out that although the laser discharge chamber 18 is illustrated as having a rectangular cross-section, other cross-sectional configurations, such as circular, may be employed instead. The cross-sectional dimensions of the chamber 18 should be suitable for guiding laser light, typically ranging from about 0.25 $mm^2$ to about 7.5 $mm^2$. As a specific example for illustrative purposes, the chamber 18 may have a square cross-section 2 mm on each side and a length of about 20 cm.

The electrode members 10 and 12 may be of a metal such as aluminum, while the dielectric members 14 and 16 may be of a material such as BeO, $Al_2O_3$, or glass, for example. The electrode members 10 and 12 may be secured to the dielectric members 14 and 16 either mechanically or by means of a suitable bonding material, with the assembly mounted on a block 20 of a material having a high thermal conductivity, such as copper, for example. In order to enhance both heat removal and structural rigidity, the electrode member 12 may be mounted in a close-fitting elongated groove 22 in the support block 20.

The discharge chamber 18 is filled with a desired laser gas which may be either static or flowing. As a specific example for illustrative purposes, the laser gas may be a mixture of He, $N_2$ and $CO_2$ in a volume ratio of approximately 8:1:1, although it should be understood that other laser gases and gas mixture ratios may be employed instead. For example, when $N_2$ is removed from the aforementioned gas mixture, the resultant laser output pulses have a much shorter trailing edge, thereby enabling the laser energy to be concentrated into pulses of higher peak power. Laser gas pressures may range from about 20 torr to about 1000 torr, typically being about 100 to 200 torr.

When a laser according to the invention is to be operated as an oscillator, a pair of aligned reflectors 24 and 26, one of which is made partially transmissive, may be disposed at or beyond opposite ends of the chamber 18 along the longitudinal axis thereof. However, a laser according to the invention also may be operated as an amplifier, in which case reflectors 24 and 26 would be replaced by windows which allow a laser beam to be amplified to enter and leave the chamber 18.

In order to establish an electric discharge in the laser gas sufficient to invert the population of the energy levels of the desired laser transition, pulsed bursts of rf voltage are applied between the electrode members 10 and 12. Exemplary circuitry for generating these rf bursts and applying them to the electrodes 10 and 12 is illustrated in FIG. 1, although it should be understood that other circuitry also is suitable and may be employed instead.

In FIG. 1 a pulsed rf voltage source 30 is shown as including an rf generator 32 for generating a sinusoidal ac voltage at an rf frequency generally ranging from about 30 MHz to about 3 GHz. The output from the rf generator 32 is applied to an electronic switch 34, the operative condition of which is controlled by a pulse generator 36. The pulse generator 36 applies control pulses to the switch 34 so that in the presence of a control pulse the switch 34 is operative to pass the ac voltage from the rf generator 32 to output terminals 37 and 38 of the source 30 for the duration of the control pulse, and in the absence of a control pulse to block the ac voltage from the rf generator 32 and thus provide no voltage between the terminals 37 and 38.

The control pulses from the pulse generator 36 may have a duration ranging from about 0.1 μsec. to about 10 μsec. and a pulse repetition rate ranging from about 500 Hz to about 100 kHz. As a specific example solely for illustrative purposes, pulsed rf source 30 may be constructed with the following specific parameter values: rf generator 32 operating at a frequency of 150 MHz, pulse generator 36 providing control pulses of 3 μsec. duration at a pulse repetition rate of 1 kHz, source 30 providing between output terminals 37 and 38 bursts of rf voltage ranging from 150 to 600 volts rms and having an output impedance of 50 ohms measured between terminals 37 and 38.

In order to achieve efficient power transfer between the pulsed rf voltage source 30 and the laser head, an impedance matching network 40 is coupled between the source output terminals 37 and 38 and laser head input terminals 41 and 42 which are connected to the respective electrode members 10 and 12. An exemplary impedance matching network 40 may include a first variable capacitor 44 coupled between source output terminal 37 and laser head input terminal 41 and a second variable capacitor 46 coupled between laser head input terminals 41 and 42, terminal 42 being connected to source output terminal 38. It should be understood, of course, that a wide variety of other impedance matching network configurations are also suitable and may be employed instead.

Optimum impedance matching of the pulsed rf voltage source 30 to the laser head occurs when the impedance $Z_s$ of the source 30 as seen looking toward the source 30 from the laser head input terminals 41 and 42 is equal to the complex conjugate of the laser head impedance $Z_L$ as seen looking toward the electrode members 10 and 12 from the terminals 41 and 42, or as expressed mathematically, $Z_s = Z_L^*$.

Figure 3:
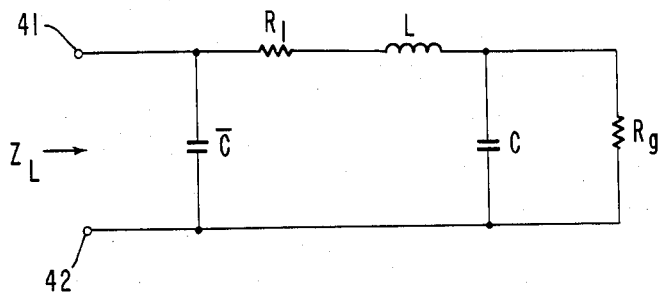
FIG. 3 is a schematic circuit diagram representing a lumped equivalent circuit for the laser head of FIG. 1.

An appropriate impedance for the impedance matching network 40 may be determined by using a lumped equivalent circuit to model the electrical circuit behavior of the laser head, such an equivalent circuit being depicted in FIG. 3. In FIG. 3, $R_1$ represents the resistance of the input leads to the electrodes 10 and 12, L represents the inductance of the input leads, C represents the capacitance of the electrodes 10 and 12, $\overline{C}$ represents the stray input capacitance, and $R_g$ represents the resistance of the discharge in the chamber 18. Typical values for these equivalent circuit parameters for a laser constructed according to FIG. 1 using the aforementioned specific exemplary parameter values are given below in Table I.

TABLE I

| Parameter | Value |
|---|---|
| $R_1$ | 0.12 ohms |
| L | 82 nh |
| C | 44 pf |
| $\overline{C}$ | 2.4 pf |
| $R_g$ | 160 ohms |

From the equivalent circuit of FIG. 3, the laser head impedance $Z_L$ between the terminals 41 and 42 may be determined to be given by:

$$Z_L = R_L + jX_L = \frac{(ac + bd) + j(da - cb)}{a^2 + b^2} \quad (1)$$

where
$a = 1 - \omega^2 L\overline{C} - \omega^2 C\overline{C} R_g R_1$
$b = \omega\overline{C}(R_g + R_1) - \omega^3 LC\overline{C} R_g + \omega CR_g$
$c = R_1 + R_g - \omega^2 LCR_g$
$d = \omega L + \omega CR_1 R_g$
$\omega = 2\pi f$.

Using the specific exemplary parameter values given in Table I in Equation (1), $R_L$ and $X_L$ may be calculated to be $R_L = 4.76$ ohms and $X_L = 61.1$ ohms.

As was mentioned above, optimum matching of the source 30 to the laser head occurs when the impedance of the source 30 as seen looking through the matching network 40 from the terminals 41 and 42 is equal to the complex conjugate $Z_L^*$ of the laser head impedance as seen from the terminals 41 and 42. Thus, $$Z_s = R_L - jX_L = \frac{\omega^2 Z_o C_s^2 - j[\omega^3 Z_o^2 C_s^2 C_p + \omega(C_s + C_p)]}{\omega^4 Z_o^2 C_s^2 C_p^2 + \omega^2(C_s + C_p)^2} \quad (2)$$

where $C_s$ is the capacitance of capacitor 44, $C_p$ is the capacitance of capacitor 46, and $Z_o$ is the impedance of the pulsed rf voltage source 30 which is assumed to be real. Using the aforementioned calculated values for $R_L$ and $X_L$ in Equation (2), along with $Z_o = 50$ ohms and $\omega = 9.42 \times 10^8$ radians per second (corresponding to an rf frequency f = 150 MHz), the capacitances $C_s$ and $C_p$ may be calculated to be $C_s = 5.5$ pF and $C_p = 12.0$ pf.

Figure 4:
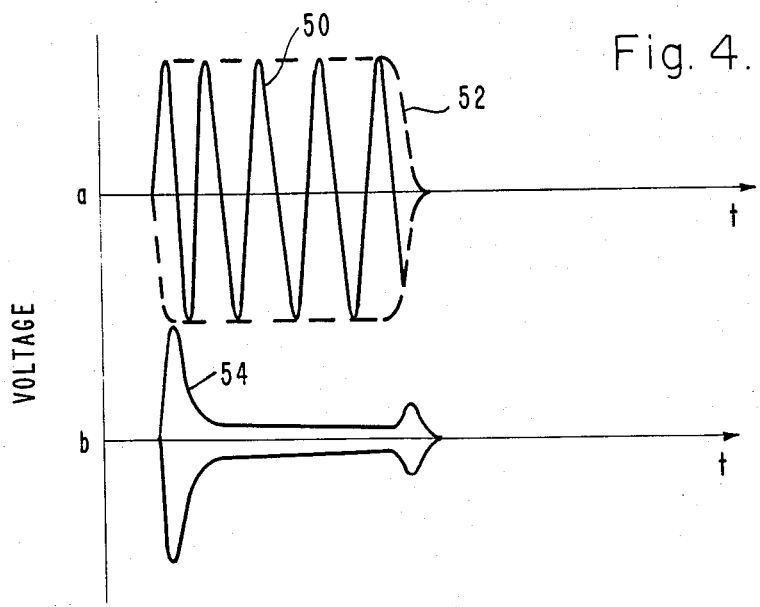
FIGS. 4a and 4b show respective waveforms of the forward and reflected voltage as a function of time at the input to the impedance matching network in FIG. 1.

The manner in which the aforedescribed impedance matching network 40 functions to efficiently transfer the excitation voltage from the source 30 to the laser head with minimum reflection is illustrated in FIGS. 4a and 4b. Waveform 50 of FIG. 4a shows the output voltage from the source 30 appearing across terminals 37 and 38, the envelope of the waveform 50 being depicted by dashed line 52 which represents an individual pulse, or burst, of rf voltage. The duration of the burst 52 corresponds to the duration of a control pulse from the pulse generator 36.

The envelope of the voltage reflected back to the terminals 37 and 38 from the laser head via the impedance matching network 40 is illustrated by waveform 54 of FIG. 4b. It may be seen that shortly after an initial surge at the commencement of the burst 52 (as an electric discharge commences within the chamber 18), the reflected voltage 54 decays rapidly to low steady-state value (when the discharge becomes established), with another small surge occurring at the termination of the burst 52.

Figure 5:
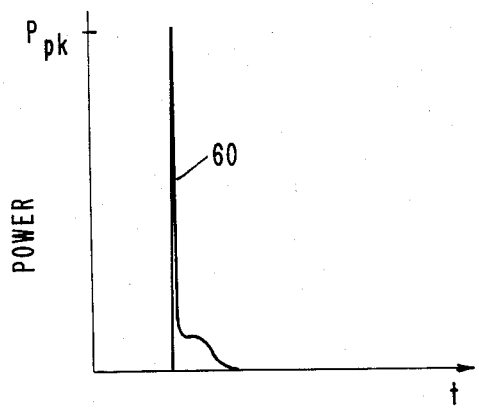
FIG. 5 is timing waveform illustrating a laser output power pulse from the laser of FIG. 1.

An exemplary laser output power pulse from a laser according to the invention is illustrated by pulse 60 of FIG. 5. Pulse 60 was obtained using a laser constructed according to FIGS. 1 and 2 with the aforementioned specific exemplary parameter values except that the laser gas was a 3:1 volume mixture of He and $CO_2$ at a pressure of 180 torr. The laser output pulse 60 was measured to have a peak power $P_{pk}$ of approximately 400 watts and a duration of approximately 150 nsec. at half power. A laser according to FIGS. 1 and 2 was also operated with parameters (such as laser gas mixture and pressure, excitation pulse duration and repetition rate) which varied slightly from the aforementioned specific exemplary parameters, and the laser consistently generated output power pulses ranging from about 100 watts to about 400 watts peak power with half power durations ranging from about 150 nsec. to about 200 nsec.

From the foregoing it may be seen that a laser according to the invention porvides laser output pulses of substantially higher peak power and considerably shorter duration than heretofore has been achieved with prior art waveguide lasers excited with bursts of transverse rf energy. Moreover, in contrast to the multi-line laser output pulses furnished by such prior art lasers, a laser according to the invention provides single-line output pulses that are frequency stable in the lowest order mode. In addition, output pulses from a laser according to the invention are automatically linearly polarized along a direction parallel to the opposing surfaces of the electrode members 10 and 12 without the need for a special polarizing element such as a Brewster window or a diffraction grating. Further, a laser according to the invention is of minimum size, weight, and complexity, and it may be excited with smaller rf excitation voltages than the aforementioned prior art waveguide lasers.

It is believed that the substantial increase in output pulse peak power and the substantial decrease in output pulse duration achieved with a laser according to the invention result from a gain-switching phenomenon that occurs in the laser gas. For a given laser system, if the gain of the laser medium increases fast enough, then a rapid pulse output will occur (gain switching). This is similar to rapidly changing the threshold gain of the laser resonator by suddenly increasing the resonator reflectivity (Q switching). More specifically, for a given laser medium and resonator, a certain amount of time $\tau_R$ is required for the laser to actually commence oscillation after the laser medium has reached a threshold gain condition. The threshold gain $g_{th}$ is defined by:

$$g_{th} = \alpha - \frac{\ln R}{2L}, \quad (3)$$

where $\alpha$ represents the round-trip resonator losses, L is the resonator length, and R is the reflectivity of the reasonator mirrors.

Gain switching will occur when the small signal gain $g_o(t)$, after a time $\tau_R$ increases to a value at least about five times the threshold gain $g_{th}$. Expressed mathematically:

$$g_o(\tau_R) \gtrsim 5 g_{th}. \quad (4)$$

In other words, if during the time interval between when the gain reaches the threshold condition and when laser oscillation actually commences, the gain increases further to at least about five times the threshold value, then gain switching will occur. In a laser according to the present invention, the laser gas is excited so rapidly with short duration bursts of rf energy that gain switching occurs in the laser gas, resulting in high peak power, short duration, single-line laser output pulses.

Although the present invention has been shown and described with reference to a particular embodiment, nevertheless, various changes and modifications which are obvious to a person skilled in the art to which the invention pertains are deemed to lie within the spirit, scope, and contemplation of the invention.

I claim:

1. A waveguide laser comprising:
   means defining an elongated chamber of cross-sectional dimensions suitable for guiding laser light;
   a laser gas disposed in said chamber; and
   means for providing an excitation electric field in said chamber along a direction transverse to the length thereof to establish a laser-exciting discharge in said laser gas, said excitation electric field consisting of a series of bursts of an alternating electric field at a frequency ranging from about 30 MHz to about 3 GHz, said bursts having a duration ranging from about 0.1 $\mu$sec. to about 10 $\mu$sec. and a repetition rate ranging from about 500 Hz to about 100 kHz.

2. A waveguide laser according to claim 1 wherein said excitation electric field is sufficient so that during a time interval between when the gain $g_o$ reaches the threshold condition $g_o = g_{th}$ and when laser oscillation actually commences, the gain $g_o$ increases further to several times the threshold value $g_{th}$.

3. A waveguide laser according to claims 1 or 2 wherein said laser gas consists of a mixture of He, $N_2$, and $CO_2$ at a pressure ranging from about 20 torr to about 1000 torr.

4. A waveguide laser according to claims 1 or 2 wherein said laser gas consists of a mixture of He and $CO_2$ at a pressure ranging from about 20 torr to about 1000 torr.

5. A waveguide laser comprising:
   means defining an elongated chamber of cross-sectional dimensions suitable for guiding laser light and including first and second elongated electrically conductive elements disposed parallel to one another on opposite sides of said chamber;
   a laser gas disposed in said chamber; and
   means for generating an excitation voltage and for applying said excitation voltage between said first and second electrically conductive elements to establish a laser-exciting discharge in said laser gas, said excitation voltage consisting of a series of bursts of an alternating polarity voltage at a frequency ranging from about 30 MHz to about 3 GHz, said bursts having a duration ranging from about 0.1 $\mu$sec. to about 10 $\mu$sec. and a repetition rate ranging from about 500 Hz to about 100 kHz.

6. A waveguide laser according to claim 5 wherein the last-named means includes a voltage source for generating said excitation voltage and an impedance matching network having first and second terminals coupled to said voltage source and third and fourth terminals respectively coupled to said first and second elongated electrically conductive elements, said impedance matching network providing between said third and fourth terminals an impedance approximately equal to the complex conjugate of the impedance of the first-named means as measured between said third and fourth terminals.

* * * * *